Patented May 18, 1954

2,678,940

UNITED STATES PATENT OFFICE 2,678,940

PREPARATION OF ALIPHATIC TRIESTERS OF PHOSPHOROUS ACID

William P. Boyer and Jesse Roger Mangham, Chesterfield County, Va., assignors to Virginia-Carolina Chemical Corporation, Richmond, Va., a corporation of Virginia No Drawing. Application January 19, 1951, Serial No. 206,910

9 Claims. (Cl. 260—461)

The reaction of phosphorus trihalides, usually the trichloride, with aliphatic and aromatic hydroxy compounds has been known for many years. In the aromatic series the tertiary phosphite (triester) is conveniently prepared by simply heating phosphorus trichloride with an excess of a phenol. This is illustrated by the following equation:

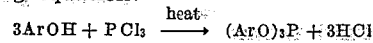

$$3ArOH + PCl_3 \xrightarrow{heat} (ArO)_3P + 3HCl$$

Ar represents an aryl radical.

Specifically, when phenol itself is used, the product is $(C_6H_5O)_3P$, triphenyl phosphite.

When phosphorus trichloride is dropped into an aliphatic alcohol the triester is immediately formed. In the absence of a base to remove the hydrogen chloride, the triester formed is decomposed by the liberated hydrogen chloride into the acid esters and aliphatic chloride. The following equations illustrate this:

(1)  $3ROH + PCl_3 \rightarrow (RO)_3P + 3HCl$
(2)  $(RO)_3P + HCl \rightarrow (RO)_2POH + RCl$
(3)  $(RO)_2POH + HCl \rightarrow ROP(OH)_2 + RCl$
(4)  $ROP(OH)_2 + HCl \rightarrow P(OH)_3 + RCl$ R represents an aliphatic radical.

Aliphatic phosphites prepared in this way, therefore, are essentially mixtures of mono- and diesters along with varying amounts of phosphorous acid; ordinarily only trace amounts of the triester being present.

Removal of the hydrogen chloride necessary for the preparation of pure triesters has in the past been accomplished through the use of an alkoxide (alcoholate) or by use of a tertiary organic amine base. With alkoxides the yields are low, and the tertiary ester is contaminated with considerable amounts of the diester. With a tertiary base (in an inert solvent) both the yield and purity of the trialiphatic phosphite are good. However, such a procedure is quite expensive and any commercial adaptation necessitates the tedious recovery, purification and reuse of the organic base. Such a procedure using the organic base dimethylaniline is described in Patent No. 2,175,509. Other suitable tertiary bases include pyridine, diethyl aniline, trimethyl amine, triethyl amine, and others similar in kind. Inert solvents which have been used include diethyl ether, petroleum ether, methyl chloride, methyl ether, propane, butane, pentane and others of a similar nature.

In our invention we have eliminated the need of expensive tertiary organic bases and have substituted the relatively cheap base anhydrous ammonia. Our procedure provides a commercially feasible method of preparing in high yields substantially pure trialiphatic phosphites.

Broadly stated we simultaneously add ammonia and phosphorus trihalide (chloride, bromide or iodide) to an aliphatic alcohol while cooling. This reaction may be represented by the following equation:

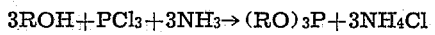

$$3ROH + PCl_3 + 3NH_3 \rightarrow (RO)_3P + 3NH_4Cl$$

In this and the following equations R represents an aliphatic radical. The ammonia can be removed from the ammonium chloride by the conventional method and reused.

As we have shown above, removal of the hydrogen chloride during the synthetic reaction is necessary to prevent its reaction with the triester to form mono- and diesters along with phosphorous acid. Anhydrous ammonia as an agent for removal of this hydrogen chloride has heretofore been considered impractical since it reacts with phosphorus trichloride and aliphatic chlorophosphites to form amidophosphites in the following manner:

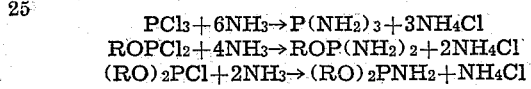

$$PCl_3 + 6NH_3 \rightarrow P(NH_2)_3 + 3NH_4Cl$$
$$ROPCl_2 + 4NH_3 \rightarrow ROP(NH_2)_2 + 2NH_4Cl$$
$$(RO)_2PCl + 2NH_3 \rightarrow (RO)_2PNH_2 + NH_4Cl$$

In addition at slightly elevated temperatures both ammonia and ammonium chloride react with the phosphite esters to displace one or more aliphatic groups. Since these are complicated reactions leading to many products, the simple illustrations given serve only to show the type of reactions to be expected.

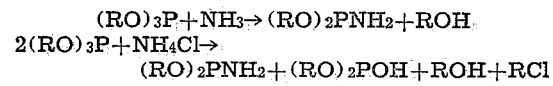

$$(RO)_3P + NH_3 \rightarrow (RO)_2PNH_2 + ROH$$
$$2(RO)_3P + NH_4Cl \rightarrow$$
$$(RO)_2PNH_2 + (RO)_2POH + ROH + RCl$$

Our invention therefore has accomplished the removal of the corrosive hydrogen chloride and at the same time has minimized the undesirable reactions of ammonia and ammonium chloride. By our method we have prepared triethyl phosphite, tributyl phosphite, triamyl phosphite, triheptyl phosphite, and tri-2-ethylhexyl phosphite in yields of 70, 86, 72, 39 and 73 per cent respectively. The purities of these materials are excellent.

Our invention, more specifically, comprises forming a trialiphatic phosphite by adding phosphorus trichloride to the theoretical amount or an excess of an aliphatic alcohol which may or may not be diluted with an inert solvent and at the same time adding dry ammonia so that the hydrogen chloride liberated in the reaction is just neutralized. The ammonium chloride formed is removed and upon evaporation of the solvent or excess alcohol a relatively pure triester is obtained. This product may be further purified by a simple distillation.

In carrying out our process the optimum temperature for the reaction varies with the amount of solvent used, the efficiency of stirring during the mixing of the reactants, and with the number of carbon atoms contained in the aliphatic chain of the alcohol. For the triethyl compound the reaction temperature should fall substantially within the range of $-10°$ C. to $5°$ C., but it should be understood that the use of higher or lower temperatures is within the scope of our invention. For the production of tributyl phosphite a temperature of $0-5°$ C. should be employed, but a lower temperature is satisfactory. Good yields of tributyl phosphite are obtained at $15-20°$ C. if good stirring and a large excess of solvent are employed. Generally the optimum temperature lies within the range from $-10°$ C. to $25°$ C.

With regard to the quantities of reagents used, at least the theoretical amount of alcohol should be used. An excess of alcohol gives satisfactory results.

Many inert solvents, e. g. ether, hexane, heptane, etc. are suitable for diluting the alcohol during the reaction. A large excess of alcohol may serve as a solvent. However, alcohols solubilize ammonium chloride to some extent so that removal of this salt from solutions containing alcohol is most efficiently accomplished by washing with water. Since trialiphatic phosphites are somewhat sensitive to hydrolysis in contact with water, it is preferred to operate by diluting the theoretical amount of the alcohol with an inert solvent and to remove the ammonium chloride by filtration.

When inert solvents are used it is preferred to dilute not only the alcohol but also the phosphorus trichloride which is added to it with the inert solvent. While large excesses of inert solvents give uniformly pure triesters in high yields, the use of too small an amount prevents good stirring and permits the attack of the hydrogen chloride on the triester. The product resulting when too small an amount of solvent is used consists of a mixture of the di- and triester. The minimum amount of solvent required for the production of pure triester increases as the efficiency of the stirring decreases and decreases as the reaction temperatures are lowered. When hexane is used as the solvent and half of it is added to the phosphorus trichloride, and the other half to the alcohol, the minimum amount of hexane required in the usual procedure at $0-5°$ C. is about 2 parts by volume of hexane to 1 part by volume of the trialiphatic phosphite expected. Generally speaking, with the lower esters, e. g. triethyl ester, this ratio approaches 1:1 and with the higher esters, e. g. tri-2-ethylhexylester, the ratio is nearer to 3:1.

The rate of ammonia addition is regulated so that the reaction mixture stays essentially at the neutral point. If the reaction mixture is allowed to remain quite acidic during the entire reaction, almost none of the triester is obtained. If the reaction mixture is allowed to remain quite basic or even under a positive pressure of ammonia, the yield of trialiphatic ester is unsatisfactory and the distilled product is frequently contaminated with other phosphites resulting from side reactions.

We have found that for laboratory operations a convenient way to control and balance the ammonia and phosphorus trichloride additions so that neutral conditions are maintained is by the use of a suitable acid-base indicator in the reaction mixture. While many indicators can be made to serve, the azo type, e. g. methyl red and methyl orange, give the most easily followed color changes. These indicators are very sensitive giving their characteristic acid color in the presence of hydrogen chloride (i. e., excess phosphorus trichloride) and their characteristic basic color in the presence of excess ammonia. The phthalein type indicators, e. g. alizarin red S, brom cresol purple, bromthymol blue, thymol blue and thymol-phthalein, tend to decolorize or give less satisfactory color changes during the course of the reaction. Malachite green and p-nitrophenol also are less satisfactory than the azo type indicators mentioned above.

While we have illustrated the invention by the indicator method of observing and maintaining neutral conditions of reaction, we are not to be limited to this method since any method of observing and maintaining neutral conditions (conductiometric, spectrophotometric, electronic, simple stoichiometric addition, etc.) falls within the scope of our invention.

Our invention is illustrated but not limited by the following examples:

*Example 1*

In a 1 l. four-neck flask equipped with a stirrer, dropping funnel, thermometer and gas disperser was placed 248.8 g. (5.4 moles) of absolute ethyl alcohol. To this was added 150 ml. of dry hexane and about 10 mg. of solid methyl red indicator. This mixture was vigorously stirred at $0-5°$ C. during the addition of 247.3 g. (1.8 moles) of phosphorus trichloride dissolved in 150 ml. of dry hexane. Anhydrous ammonia was added at a rate such that the color of the reaction mixture was kept very slightly orange (the neutral to very slightly basic color of methyl red). After two hours the addition of phosphorus trichloride was complete. The ammonium chloride was removed by filtration and after removal of the solvent by distillation the product was distilled. The colorless oil which distilled at B. P. $62-5°$ C. at 24 mm. weighed 196.8 g., 68% of the theoretical amount. Its refractive index, $n_D^{25}$ 1.4101, and specific gravity, $$\frac{20°}{4°} 0.968$$

are identical with those of highly purified triethyl phosphite.

*Example 2*

In a 500 ml. four-neck flask equipped with a stirrer, dropping funnel, thermometer and gas disperser was placed 133.4 g. (1.8 moles) of substantially anhydrous butyl alcohol and about 10 mg. of solid methyl red indicator. This mixture was maintained at $0-5°$ C. and stirred very vigorously while 41.2 g. (0.3 mole) of phosphorus trichloride was slowly added. Enough anhydrous ammonia to keep the indicator slightly orange (neutral to very slightly basic) was gradually added throughout the phosphorus trichloride addition. The reaction mixture was then washed thoroughly with cold water and dried over anhydrous sodium sulfate. After removal of the excess butyl alcohol, by distillation, the product distilled at 1.5 mm., B. P. 101–107° C. The yield was 63.5 g., 84% of the theoretical amount. From its physical constants this material was judged to be 87% tributyl phosphite and 13% dibutyl hydrogen phosphite.

*Example 3*

In a 22 l. four-neck flask equipped with a stirrer, dropping funnel, thermometer and gas disperser was placed 10 lbs. (0.135 lb. mole) of commercial butyl alcohol, about 0.1 g. of solid methyl red indicator, and 7 lb. 6 oz. of Skelly Solve B (petroleum ether B. P. 65–69° C.). To this vigorously stirred mixture cooled to 0–5° C. was added 6 lb. 3 oz. (0.045 lb. mole) of phosphorus trichloride in 7 lb. 6 of Skelly Solve B during six hours. Also during this time anhydrous ammonia was added at a rate sufficient to keep the reaction mixture just neutral as indicated by the methyl red color (slightly orange). After removal of ammonium chloride by filtration and the solvent by distillation, the product was distilled under reduced pressure through a modified Claisen head. There was obtained 9 lb. 11 oz. (86% yield of theory) of tributyl phosphite, boiling at 121–5° C. at 6 mm. The product was a colorless oil having the physical constants $n_D^{22}$ 1.4300, $d\ _4^{20°}$ 0.925. These values correspond closely with those of highly purified tributyl phosphite.

*Example 4*

The reaction was carried out in a 500 ml. four-neck flask equipped with a stirrer, dropping funnel, thermometer and gas disperser. Into a solution of 52.6 g. (0.6 mole) of n-amyl alcohol, 100 ml. of dry hexane and about 10 mg. of methyl red held at 0–5° C. during reaction, was added 27.5 g. (0.2 mole) of phosphorus trichloride during thirty minutes. During this time the reaction mixture was kept neutral by the gradual addition of anhydrous ammonia. After removal of the ammonium chloride and solvent, the product was distilled from a modified Claisen flask. There was obtained 42 g. (72%) of colorless triamyl phosphite, B. P. 102–109° C. at 0.25 mm., $n_D^{25}$ 1.4370, $d\ _4^{20°}$ 0.920.

*Analysis.*—Calc. for $C_{15}H_{33}O_3P$: P, 10.60. Found: P, 10.64.

*Example 5*

In a 500 ml. four-neck flask was placed 69.7 g. (0.6 mole) of n-heptyl alcohol, 100 ml. of hexane, and about 10 mg. of methyl red indicator. The flask was equipped with stirrer, dropping funnel, thermometer, and gas dispersing tube. To the stirred alcohol solution was added 27.5 g. (0.2 mole) of phosphorus trichloride in 100 ml. of hexane during thirty minutes. During this time the reaction mixture was kept neutral by the slow addition of anhydrous ammonia. After removal of the precipitated ammonium chloride and solvent, the product triheptyl phosphite, was distilled in vacuo. Its physical constants are B. P. 162–167° C. at 0.5 mm. $n_D^{25}$ 1.4433, $d\ _4^{20°}$ 0.902. The yield was 39% of the theoretical.

*Analysis.*—Calc. for $C_{21}H_{45}O_3P$: P, 8.25. Found: P, 8.45.

*Example 6*

In a 500 ml. four-neck flask equipped with a stirrer, dropping funnel, thermometer and gas disperser was placed 87.1 g. (0.6 mole) of 2-ethylhexyl alcohol, 100 ml. of hexane and about 10 mg. of methyl red indicator. To this vigorously stirred solution was added 27.5 g. (0.2 mole) of phosphorus trichloride in 100 ml. of hexane during thirty-five minutes. Anhydrous ammonia was added simultaneously at a rate sufficient to keep the reaction mixture neutral. After removal of the ammonium chloride by filtration the solvent was distilled. Vacuum distillation of the resulting oil from a modified Claisen flask yielded 60.9 g. of tri-2-ethylhexyl phosphite, B. P. 157–164° C. at 0.3 mm., $n_D^{25}$ 1.4475, and $d\ _4^{20°}$ 0.902. The yield of distilled material was 73%.

*Analysis.*—Calc. for $C_{24}H_{51}O_3P$: P, 7.40. Found: P, 7.54.

As appears from the foregoing disclosure, the invention is applicable for the production of aliphatic triesters of phosphorous acid generally by reaction of a phosphorus trihalide with various alcohols including mono-, di-, and polyhydroxy alcohols, primary and secondary alcohols in which the hydrocarbon group is straight chain or branched, saturated and unsaturated alcohols and alcohols in which hydrogen of the hydrocarbon group is unsubstituted or substituted by inactive substituents such as halogen. No limit has been found and none appears probable as to the size of the aliphatic group at least up to those having 18 carbon atoms.

While the use of inert solvent or excess of the alcohol or excess of the alcohol or both is not essential, such use is an important feature of the process from the standpoint of economical production of the desired triesters.

The temperature at which the reaction is carried out, like the use of solvent, also is not the essence of the invention but is an important consideration, particularly when correlated with the use of solvent, the degree of agitation and the size of the aliphatic group, in determining the optimum conditions for operation of the process.

While we have described more particularly the addition of phosphorus trihalide to a body of the alcohol in the presence or absence of inert solvent and with simultaneous addition of anhydrous ammonia at such a rate as to maintain the reaction mixture substantially neutral, the reaction may be carried out by a simultaneous addition of the phosphorus trihalide and the alcohol to a reaction space which may at the start be empty or may contain some of the alcohol and/or inert solvent provided that anhydrous ammonia also is added at such a rate as to maintain the reaction mixture substantially neutral and provided further that an excess of the phosphorus trihalide in the reaction mixture is avoided.

We claim:

1. Process for the production of aliphatic triesters of phosphorous acid which comprises gradually adding phosphorus trihalide to a body of an aliphatic alcohol while stirring and maintaining the temperature of the resulting mixture within the range from about −10° C. to about 25° C. and while maintaining the reaction mixture substantially neutral by the addition of ammonia, the total quantity of phosphorus trihalide added being not greater than one-third mol to each mol of the alcohol in the reaction mixture.

2. Process as defined in claim 1 in which the phosphorus halide is phosphorus trichloride.

3. Process as defined in claim 1 in which the quantity of alcohol in the reaction mixture is stoichiometrically in substantial excess of the quantity of phosphorus trihalide.

4. Process as defined in claim 1 in which the reaction mixture contains an excess of the alcohol serving as solvent for the reaction mixture.

5. Process as defined in claim 1 in which the reaction is carried out in the presence of an inert solvent.

6. Process as defined in claim 1 in which the phosphorus trihalide is added gradually to a body of the alcohol and an inert solvent.

7. Process as defined in claim 1 in which a solution of the phosphorus trihalide in an inert solvent is added to the alcohol.

8. Process as defined in claim 1 in which a solution of the phosphorus halide in an inert solvent is gradually added to a body of a solution of the alcohol in said inert solvent.

9. Process for the production of aliphatic triesters of phosphorous acid which comprises gradually adding a solution of phosphorus trichloride in an inert solvent to a body of a solution of an aliphatic alcohol in said inert solvent in the presence of an acid-base indicator while maintaining said body under vigorous agitation and at a temperature within the range from about −10° C. to about 25° C. and substantially neutral by the addition of anhydrous ammonia, the amount of phosphorus trichloride added being not more than the stoichiometric equivalent of the alcohol.

References Cited in the file of this patent

UNITED STATES PATENTS

| Number | Name | Date |
|---|---|---|
| 2,046,031 | Mugdon et al. | June 30, 1936 |
| 2,175,509 | Rogers | Oct. 10, 1939 |
| 2,370,786 | Fox | Mar. 6, 1945 |
| 2,480,790 | Truhlar et al. | Aug. 30, 1949 |
| 2,485,341 | Wasson et al. | Oct. 18, 1949 |

OTHER REFERENCES

Gerrard: Journal of the Chemical Soc. (London) (1940), pp. 1464 to 1469.

McCombie et al.: Journal of the Chemical Soc. (London) (1945), pp. 380 to 382.

Chem. Abstract, vol. 42, p. 7147 (1948).

Chem. Abstract, vol. 44, p. 11076 (1950).

Kosolapoff. Organo-Phosphorus Compounds (1950), pp. 203–204.